United States Patent [19]

Spielau et al.

[11] 4,319,001
[45] Mar. 9, 1982

[54] TERNARY THERMOPLASTIC MOLDING COMPOSITION CONTAINING ETHYLENE-PROPYLENE COPOLYMER

[75] Inventors: Paul Spielau, Troisdorf-Eschmar; Werner Kühnel, Neunkirchen-Schöneshof; Dietmar Welsch, Weissenburg; Gerd Klingberg, Lohmar; Hans E. Konermann; Wilfried Leeder, both of Troisdorf, all of Fed. Rep. of Germany

[73] Assignee: Dynamit Nobel Aktiengesellschaft, Troisdorf, Fed. Rep. of Germany

[21] Appl. No.: 249,479

[22] Filed: Mar. 31, 1981

[30] Foreign Application Priority Data

Apr. 2, 1980 [DE] Fed. Rep. of Germany ....... 3012763

[51] Int. Cl.$^3$ .................... C08L 23/16; C08L 51/06
[52] U.S. Cl. ...................................... 525/70; 525/240
[58] Field of Search ................................ 525/70, 240

[56] References Cited

U.S. PATENT DOCUMENTS 4,087,485  5/1978  Huff ..................................... 525/240
4,251,646  2/1981  Smith .................................... 525/88

Primary Examiner—Carman J. Seccuro
Attorney, Agent, or Firm—Craig and Antonelli

[57] ABSTRACT

A ternary molding composition is formed of an admixture of a modified ethylene-propylene copolymer, a propylene polymer and polyethylene and contains 35–50% by weight of a modified ethylene-propylene copolymer, which is prepared by the polymerization of an ethylene-propylene copolymer onto polyethylene, with the ethylene content of the ethylene-propylene copolymer being at least 65% by weight and the modified copolymer having a melt index MFI (230/5) of 0.8–2.0 g/10 min; 30–60% by weight of polypropylene with a melt index MFI (230/5) of 25–65 g/10 min and/or propylene-ethylene copolymer with a melt index MFI (230/5) of 15–50 g/10 min, and 3–30% by weight of polyethylene, wherein the polyethylene block of the modified ethylene-propylene copolymer can be attributable to the quantity of polyethylene contained in said composition.

8 Claims, No Drawings

TERNARY THERMOPLASTIC MOLDING COMPOSITION CONTAINING ETHYLENE-PROPYLENE COPOLYMER

The invention relates to a ternary molding composition containing an ethylene-propylene copolymer grafted to polyethylene, a propylene polymer, and polyethylene.

Polypropylene exhibits, besides several very advantageous properties such as, for example, a relatively low density, excellent resistance to higher temperatures and aqueous and non-aqueous liquids, also less favorable characteristics, such as inadequate impact strength at temperatures below room temperature, especially below 0° C. However, adequate impact strength is required and is of importance in many uses, such as, for example, for freight containers, suitcases, automobile parts, and similar products. Polyethylene of high density, of which such molded articles are ordinarily made, does possess this satisfactory high impact strength, but shows a lower resistance to high temperatures.

Ethylene-propylene copolymers, the saturated ones as well as the unsaturated ones, exhibit, besides good mechanical properties, a high aging resistance and ozone resistance, as well as resistance to low temperatures, so that these copolymers are also excellently suitable, in particular, for usages where the product is exposed to weathering. Due to the elastomeric properties of these copolymers it is popular to combine such copolymers with harder polymers.

Many attempts have been made to combine the properties of polypropylene and/or polyethylene and/or ethylene-propylene copolymers by the production of binary or ternary molding compositions. It is known, for example, to utilize mixtures of polypropylene and polyethylene; however, these mixtures exhibit an impact strength which is hardly improved over polypropylene by itself. DOS Applications [German Unexamined Laid-Open Applications] Nos. 2,202,706 and 2,202,738 disclose blends of isotactic polypropylene and ethylene-propylene elastomers which are either partially crosslinked after blending by adding vulcanizing agents or wherein already partially crosslinked EPM (ethylene-propylene bipolymer) polymer is utilized during the manufacture. Such mixtures, however, still require improvement with respect to the tensile strength values, elongation at yield, tear propagation resistance, as well as the hardness values attainable, measured at 100° C., for many fields of usage, i.e. they do not satisfy the posed requirements for all applications.

Blends of polyethylene with EPDM (terpolymers of ethylene-propylene and a non-conjugated diene) polymers, the crystallinity of which ranges between 10% and 20%, are known from U.S. Pat. No. 3,919,358. Such products, though exhibiting high tear strengths, do not show sufficient heat resistance due to the low melting temperature of polyethylene; also, permanent deformation, rigidity, and hardness are unsatisfactory.

DOS No. 2,732,969 discloses a binary molding composition of noncrosslinked ethylene-propylene sequence-type polymers with isotactic polypropylene. However, it has been found that such blends exhibit, depending on their composition, either an inadequate cold flexibility or an insufficient dimensional stability at high temperatures.

A ternary molding composition that is described in British Pat. No. 1,154,447, contains 50-90% by weight of crystalline polypropylene (insoluble in n-heptane to an extent of more than 90% by weight) and 5-30% by weight of polyethylene and 5-40% by weight of ethylene-propylene block copolymer (insoluble in n-heptane to an extent of 80% by weight). This composition when molded exhibits a tensile strength of only 10 N/mm$^2$ and is no longer flexible at temperatures below $-30°$ C., i.e. it becomes brittle and breaks.

DOS No. 2,828,763 discloses a polypropylene molding composition of 90-60% by weight of polypropylene, 4-30% by weight of polyethylene, and 6-30% by weight of an elastomeric ethylene-propylene copolymer wherein the melt index of the elastomer mixture of ethylene-propylene copolymer and polyethylene to the melt index of the polypropylene is to have a ratio of 2-15 of the MFI (230/5) with respect to each other. The properties attainable with this molding composition still leave very much to be desired, especially regarding, for example, the notch impact strength at very low temperatures, since products made therefrom, such as automobile bumpers, for example, are nowise usable any longer at temperatures of $-30°$ C. and therebelow and, therefore, this molding composition is useless for this application, for example. Also, not all molding compositions show the desired, good processability in the injection-molding process, due to the fact that the melt index is much too low.

In contrast thereto, DOS No. 2,742,910 describes a thermoplastic mixture of elastomers containing 25-85% by weight of a practically amorphous ethylene-propylene copolymer and 15-75% by weight of a crystalline block copolymer of propylene and optionally additional polyethylene. As set forth in DOS No. 2,821,342, this molding composition is in need of improvement regarding hardness, tensile strength, higher stability at high temperatures, and is excelled with respect to these properties, for example, by a molding composition according to DOS No. 2,821,342 as demonstrated in Tables 1 and 2 therein.

DOS No. 2,821,342 discloses thermoplastic elastomer mixtures containing 30-75 parts of a crystalline, isotactic propylene homopolymer and 25-70 parts of an essentially amorphous, elastomeric ethylene-propylene polymer, and maximally 15 parts of polyethylene, replacing the propylene homopolymer in proportion. These mixtures exhibit, in part, improved properties as compared with binary molding compositions, rendering the mixtures also more suitable for the manufacture of automobile bumpers. However, it has been found that, for extreme stresses, the mechanical properties of the elastomer mixtures known from DOS No. 2,821,342 still are in need of improvement, especially with regard to the notch impact strength, tensile strength and cold flexibility.

The invention is directed to the problem of providing a thermoplastic molding composition which exhibits high thermal stability, good mechanical properties, especially tensile strength values, high cold flexibility, i.e. notch impact strength at low temperatures, and which also can be pelletized and is, in its entirety, improved over the conventional binary and ternary molding compositions with respect to one or several properties. It is likewise an object of the invention to be able to manufacture with simple means such an optimally impact-strong ternary molding composition with desired properties which is not merely an accidental, concomitant result among many such results in conventional molding compositions. The desired molding composition should also be improved with respect to shrinkage tendency and is to be suitable, in particular, for use in injection molding.

It has now been found that the aforementioned objects can be optimally attained by a molding composition containing:

(a) 35–50% by weight of a modified or grafted ethylene-propylene copolymer, produced by polymerizing the ethylene-propylene copolymer proportion onto polyethylene with the ethylene-propylene copolymer proportion having an ethylene content of at least 65% by weight, and a melt index MFI (230/5) of 0.8–2.0 g/10 min, and (b) 30–60% by weight of a polypropylene (i.e. a homopolymer of propylene) with a melt index MFI (230/5) of 25–65 g/10 min and/or propylene/ethylene copolymer with a melt index MFI (230/5) of 15–50 g/10 min, and (c) 3–30% by weight of polyethylene, wherein polyethylene block of the modified ethylene-propylene copolymer can be attributed to the total amount of polyethylene, i.e. the total amount of polyethylene comprises free polyethylene and polyethylene which is grafted to form the modified ethylene-propylene copolymer.

Surprisingly, the invention provides ternary molding compositions with high impact strength, high heat dimensionsal stability, high notch impact strength, even at low temperatures of −40° C., which furthermore are excellently suitable for processing into injection-molded articles while avoiding shrinkage. The good individual property values already present, in part, are all existent in the invention and result in a molding composition well-balanced in every way and having good to very good properties.

As compared to the molding compositions of, for example, DOS No. 2,828,763, the invention can be realized in a simple way, since the invention provides a possibility of reliably obtaining a ternary molding composition with the desired properties by selection of the individual components according to their melt indices and while maintaining certain weight proportions of the components in the molding composition. The invention also differs substantially over the polypropylene molding composition according to DOS No. 2,828,763 by its high proportion of ethylene-propylene copolymer, leading to a molding composition with properties which are improved as compared to the previously known compositions, which was not to be expected in the plurality of the conventional molding compositions.

As compared with the molding composition from DOS's Nos. 2,742,910 and 2,821,342, the invention demonstrates improved cold flexibility, tensile strength, elongation at yield, and shrinkage behavior.

The characterization of the invention on the basis of the melt indices is made because of the information contained therein regarding the flowability of the molding composition, which is essential for the processing thereof. The molding composition of this invention is to be processable, in particular, also by injection molding and therefore is to exhibit a melt index MFI (230/5) of approximately at least 8. Preferably, a modified or grafted ethylene-propylene copolymer is utilized, which contains 5–25% by weight of a polyethylene block, based on 100% by weight of the modified ethylene-propylene copolymer. In the modified ethylene-propylene copolymers according to this invention, the originally present polyethylene is preserved as a polyethylene block in crystalline form. It has been found surprisingly that a ternary molding composition according to this invention, exhibiting the desired properties, can also be produced by making the polyethylene block of the modified ethylene-propylene copolymer attributable in weight proportions to the quantity of polyethylene provided in the molding composition (i.e. to component (c)).

The ternary molding composition of this invention is especially suitable for the preparation of molded components which, on the one hand, are exposed to high temperatures of up to 100° C., but also to very low temperatures of below −30° C., wherein the other mechanical properties exhibit a balanced, high spectrum. A preferred field of use is the production of bumpers for automobiles which must withstand impact stresses even at low temperatures down to −40° C. The molding composition of this invention also satisfies these extreme requirements inasmuch as it exhibits, on the one hand, a sufficient proportion of ethylene-propylene copolymer to attain the necessary notch impact strength at low temperatures, which, however, is accompanied by a certain lowering of the dimensional stability at high temperatures. This lowering of the high-temperature dimensional stability is counteracted by using an amount according to this invention of selected propylene polymers, i.e. homopolymers and/or propylene-ethylene copolymers, imparting to the molding composition improved mechanical properties at low temperatures and simultaneously a high dimensional stability at high temperatures. The melting ranges of the propylene polymers are preferably above 155° C., preferably between 160° and 162° C. Propylene polymers exhibit, however, the disadvantage that they effect, in a blend with ethylene-propylene copolymers, a relatively large amount of dimensional reduction (shrinkage) in case of injection-molded articles. This leads to difficulties in the manufacture of corresponding, dimensionally accurate injection-molded parts. It has been found surprisingly that the third component, polyethylene, not only introduces its own, otherwise known properties, but apparently also reduces this shrinkage factor and can even extensively compensate for such shrinkage. A polyethylene having an MFI (230/5) value of larger than 15, preferably, however, between 20 and 50, has proven to be especially advantageous; this polyethylene is contained in the molding composition in amounts of between 4 and 30 parts by weight, based on the molding composition, preferably 6–20% by weight. A high-density polyethylene is preferably utilized in this connection.

Preferably, propylene polymers, i.e. homopolymers, or copolymers, are utilized for the molding composition of this invention having a melt index MFI (230/5) of between 20 and 40 g/10 min and the copolymers contain below 12% by weight of ethylene. These polymers have an isotactic character.

Preferred molding compositions of this invention, starting with the aforedescribed components with optimum properties, exhibit a ratio of the melt indices MFI (230/5) of polyethylene (c) to the modified ethylene-propylene copolymer (a) equal to or larger than 15, preferably, however, larger than 25. In this connection, it is advantageous simultaneously to provide a ratio of melt indices of polyethylene (c) to propylene homopolymer or propylene copolymer (b) of between 0.25 and 3.0.

The ternary molding compositions of the invention can also be produced in a conventional way with the aid of the equipment customary for synthetic resins, such as rolls, extruders, mixers, and masticators, wherein all components can be mixed together simultaneously. The mixing step is to be preferably conducted at an elevated temperature, especially at a temperature of between 180° and 280°, with the use of shear forces.

Additionally, conventional additives, such as coloring agents, mold release agents, fillers, antioxidants, UV stabilizers, flame-retardants, fibers, or the like can be added to the molding composition of this invention.

It is also possible to add the ternary molding compositions of this invention to other synthetic resins, for example to improve the impact strength of the other synthetic resins.

The ethylene-propylene copolymer proportion of the modified ethylene-propylene copolymer used for the invention preferably has an ethylene content of more than 70% by weight. Ethylene-propylene copolymers of high strength, high green strength elastomers, can be pelletized and thus impart also to a molding composition a processability advantage over the amorphous or almost amorphous ethylene-propylene copolymers which cannot be pelletized. According to the invention, in the presence of polyethylene, polymers, namely, ethylene-propylene copolymers are utilized, wherein the ethylene-propylene copolymers are amorphous or almost amorphous. In spite of the amorphous character of the ethylene-propylene copolymers employed, it has been found surprisingly that these modified ethylene-propylene copolymers can yet be pelletized.

Preferably an ethylene-propylene copolymer that comprises an ethylene-propylene bipolymer and/or an ethylene-propylene-nonconjugated diene terpolymer is utilized for preparing the modified ethylene-propylene copolymer of the molding composition. These copolymers are substantially block copolymers including small parts or random copolymers. The preferred copolymer ethylene-propylene consists of 65-82% by weight of ethylene, 18-35% by weight of propylene, and 0-8% by weight of a non-conjugated diene tercomponent (third component). The tercomponent is normally dicyclopentadiene, an alkylidene norbornene (ethylidenenorborne), an alkenyl norbornene, an alkadiene (hexadiene), or a cycloalkadiene (cyclohexadiene). Preferably, ethylene-propylene-diene terpolymers with a minimum tensile strength of 8.0 N/mm$^2$, preferably of a tensile strength ranging above 20 N/mm$^2$, are utilized for the molding composition according to the invention.

The ternary molding compositions of the invention can be produced in a conventional way with the aid of the equipment customary for synthetic resins, such as rolls, extruders, mixers, and masticators, wherein all components can be mixed together simultaneously. The mixing step is to be preferably conducted at an elevated temperature, especially at a temperature of between 180° and 280°, with the use of shear forces.

Additionally, conventional additives, such as coloring agents, mold release agents, fillers, antioxidants, UV stabilizers, flame-retardants, fibers, or the like can be added to the molding composition of this invention.

It is also possible to add the ternary molding compositions of this invention to other synthetic resins, for example to improve the impact strength of the other synthetic resins.

The invention will be described below with reference to several examples along with comparative examples.

The following methods are utilized for testing of the properties:

"MFI (230/5) g/10 min." obtained according to DIN No. [German Industrial Standard 53735] or MFI (190/2.16).

"Tensile strength N/mm$^2$" obtained according to DIN No. 53455.

"Notch impact strength" obtained according to DIN No. 53455 at various temperatures, un=broken, b=broken.

"Elongation at yield in %" obtained according to DIN No. 53455.

"Vicat softening temperature" indicated as VSTA °C.

Shrinkage measured after 48 hours of storage at room temperature, in mm.

Unless indicated otherwise, the information regarding the MFI refers in all cases to MFI (230/5) g/10 min.

EXAMPLE 1

A binary mixture, provided as a comparison, of 43 parts by weight of an EPDM (about 6% by weight hexadiene, 70% by weight of ethylene, and remainder propylene) having an MFI of 0.8% with 57 parts by weight of polypropylene homopolymer having an MFI of 55 is homogenized and processed into granules. The thus-formed granulated material is injection-molded at 220°-260° C. mass temperature to a molded article in the form of a bumper having a required length of 1436 mm upon removal from the injection mold. By storage at room temperature, a dimensional reduction (shrinkage) of the molded article occurs. After 48 hours, the bumper has only a length of 1435.5 mm, i.e. a shrinkage of −0.5 mm with respect to the desired length.

Additional properties are indicated in the table following Example 10.

EXAMPLE 2

A mixture, provided as a comparison, of 40 parts by weight of an EPDM having an MFI of 0.8 (same as used in Example 1) is homogenized as in Example 1 with 50 parts by weight of a polypropylene homopolymer with an MFI of 55 and 10 parts by weight of a propylene-ethylene copolymer (containing less than 12% of ethylene) having an MFI of 25, and made into granules. A bumper produced from this granulated material under the same injection-molding conditions as set forth in example 1 shows, after 48 hours of storage, a length of −1.5 mm as compared to the required length. This example demonstrates that even a small amount of a propylene copolymer results in a great shrinkage of the molded article. Additional properties are shown in the table.

EXAMPLE 3

A binary mixture of 36 parts by weight of EPDM (same as in Example 1) with an MFI of 0.8 and 64 parts by weight of a propylene-ethylene copolymer (same as in Example 2) with an MFI of 25, made for comparison purposes, is homogenized in a masticator and processed into a granulated material as described in Example 1. The thus-produced granulated material is injection-molded at a mass temperature of 220°-260° C. to a molded article having a required length of 1436 mm upon removal from the injection mold. After storing the molded article at room temperature for a period of 48 hours after removal from the injection mold, the product shows a subsequent dimensional reduction, i.e.

shrinkage, of −2.5 mm as compared with the required length.

Additional properties of this binary molding composition are listed in the table.

EXAMPLE 4

Another binary molding composition is produced from a mixture of 39 parts by weight of EPDM (same as in Example 1) having an MFI of 0.8, 37 parts by weight of a propylene-ethylene polymer (containing less than 12% by weight of ethylene) having an MFI of 25 and 24 parts of a propylene-ethylene copolymer containing less than 12% by weight of ethylene having an MFI of 65, as described in Example 1, and injection molded into a molded article as described in Example 1. The molding article removed from the injection mold shows, after only 48 hours of storage at room temperature, a shrinkage in length of −1.5 mm as contrasted to the initial dimension. In this connection, it was found that even the use of a readily flowable propylene-ethylene copolymer with a high melt index cannot compensate for the shrinkage tendency of the molded product.

Additional properties are recited in the table.

EXAMPLE 5

As a further comparative example, a binary mixture is produced from 48 parts by weight of an EPDM (as used in Example 1) with an MFI of 0.8 and 52 parts by weight of a polypropylene homopolymer with an MFI of 55 and injection-molded analogously to Example 1 to form a bumper. After 48 hours of storage at room temperature, the bumper shows a shrinkage of ±0 mm as compared to the required length.

Additional data on the properties of this mixture can be seen in the table.

EXAMPLE 6

As described in Example 1, a molding composition according to this invention consisting of 46 parts by weight of a modified EPDM, (the EPDM proportion being a terpolymer of 6% by weight of hexadiene, 70% by weight of ethylene and 24% by weight of propylene with an MFI of 1.3), produced by polymerizing the EPDM proportion onto a polyethylene, with a proportion of 10 parts by weight of polyethylene, based on 100 parts by weight of modified EPDM, and 54 parts by weight of a polypropylene homopolymer with an MFI of 55, is injection-molded to a shaped article. After storage at room temperature over a period of 48 hours, the shaped article shows, as compared with the required dimension of 1436 mm, a lengthening of +1.5 mm. Even the small amount of 4.6 parts by weight of polyethylene contained in the modified EPDM is sufficient for obtaining the desired properties. Further data are shown in the table.

EXAMPLE 7

As described in Example 1, a molding composition according to the invention made of 38 parts by weight of a modified EPDM with an MFI of 1.3, produced by polymerizing the EPDM proportion onto a polyethylene, with a proportion of 10 parts by weight of polyethylene, based on 100 parts by weight of modified EPDM (the same as described in Example 6) and 52 parts by weight of a polypropylene copolymer with an MFI of 25, and 10 parts by weight of a polyethylene having an MFI of 30, is injection-molded to a shaped article. After storage at room temperature over a period of 48 hours, the shaped article shows a lengthening of +1.5 mm as compared with the required length of 1436 mm. It will be recognized that, in total, the molding composition comprises 10+3.8=13.8 parts by weight of polyethylene.

The table provides for additional properties.

EXAMPLE 8

Example 2 from Table 2 in DOS No. 2,821,342 was incorporated as a comparative example. In this case, a mixture is prepared from 45 parts by weight of an amorphous EPDM (crystallinity below 0.25% and Mooney viscosity [$ML_{1+4}$ 125° C.] 52) with a tensile strength of 6.5 N/mm$^2$ and 50 parts by weight of propylene homopolymer with a density of 0.905 g/cm$^3$ and an MFI (230/2.16) of 5.2 dg/min corresponding to an MFI (230/5) of 21 and 5 parts by weight of polyethylene with a density of 0.963 g/cm$^3$, MFI (190/2.16) of 8, and the mixture is press-molded into a panel. This panel, however, exhibits, with a tensile strength of 10.0 N/mm$^2$, elongation at yield 150%, very moderate mechanical properties which also signify a low cold flexibility.

EXAMPLE 9

A further comparative example is derived from DOS No. 2,821,342, Table 6, Example 1, consisting in a molding composition containing 40 parts by weight of EPDM as described in Example 8, 55 parts by weight of polypropylene homopolymer as described in Example 8, and 5 parts by weight of a polyethylene as described in Example 8. This mixture, although showing an increase (improvement) of the mechanical properties as compared with Example 8, which is due to the properties of high-density polyethylene, is unsuitable for injection-molding, having a total MFI of 5.2.

EXAMPLE 10

Another comparative example is cited from DOS No. 2,828,763, Table 4, Example IV. In this case, an elastomer premix is produced from 6 parts by weight of a copolymer consisting of 44% by weight of ethylene and 56% by weight of propylene, MFI (230/5) of 1.5 g/10 min, and 4 parts by weight of polyethylene having a density of 0.947 g/cm$^3$ and an MFI (190/5) of 1.6 g/10 min; this premix is blended with 90 parts by weight of polypropylene having a density of 0.903 g/cm$^3$ and an MFI (230/5) of 9.5 g/10 min, containing 6.4% by weight of ethylene, and is processed to a test specimen. The molding composition does exhibit processability by injection-molding, with a total MFI of 9.4, which, by the way, does not hold true for any of the other examples listed in DOS No. 2,828,763. However, this molding composition is limited in its cold flexibility according to the indicated data, and is no longer cold-flexible at low temperatures of −30° C. and −40° C.

| Ex. | EPDM EPM Parts by Wt. +MFI +Tens. Str. | PP-H Parts by Wt. / MFI | PP-CO Parts by Wt. / MFI | PE Parts by Wt. / MFI 190/2.16 | MFI of Mixture 230/5 | Vicat °C | Elong. at Yield % | Tensile Strength N/mm² | Notch Impact Strength °C | -20° C. | -40° C. | Shrinkage mm | Evaluation Vicat | Notch Impact Str. | Shrinkage |
|---|---|---|---|---|---|---|---|---|---|---|---|---|---|---|---|
| 1 | 43 / 0.8 / 24.8 | 57 / 55 | | | 17 | 107 | 550 | 28 | un | b | b | −0.5 | good | very poor | good |
| 2 | 40 / 0.8 / 24.8 | 50 / 55 | 10 / 25 | | 15 | 106 | 576 | 28.7 | un | b | b | −1.5 | good | very poor | poor |
| 3 | 36 / 0.8 / 24.8 | | 64 / 25 | | 12.1 | 113 | 590 | 28.4 | un | un | b | −2.5 | good | good | very poor |
| 4 | 39 / 0.8 / 24.8 | | 37 / 25 + 24 / 65 | | 6.7 | 101 | 593 | 22.2 | un | un | un | −1.5 | moderate | very good | poor |
| 5 | 48 / 0.8 / 24.8 | 52 / 55 | | | 13.2 | 95 | 610 | 20.7 | un | un | b | ±0 | poor | good | good |
| 6 | 46 / 1.3 | 54 / 55 | | (4.6) | 15.7 | 110 | 482 | 26.1 | un | un | un | +1.5 | good | very good | good |
| 7 | 38 / 1.3 | | 52 / 25 | 10 (+3.8) | 12.8 | 110 | 500 | 23.2 | un | un | un | +1.5 | good | very good | good |
| 8 | 45 / — / 6.5 | 50 / 21 | | 5 / 8 | | | 150 | 10.0 | | | | | | poor | |
| 9 | 40 / — / 6.5 | 55 / 21 | | 5 / 8 | 5.2 | | 430 | 21.3 | | | b | | | | |
| 10 | 6 / 1.5 / — | 90 / 9.5 | | 4 | 9.4 | | | | | b | b | | | very poor | |

It will be appreciated that the table contains a compilation and supplement of the aforedescribed examples with the most important properties indicating data regarding the desired profile of required properties for technical parts under high stresses such as bumpers, for example.

The MFI of the total mixture is an indication of the flow properties and thus of the suitability for injection-molding processing; in this connection, MFI values starting with about 8 are a yardstick for good processability. The Vicat value stands for good dimensional stability under heat; elongation and tensile strength indicate the general mechanical properties, notch impact strength is a measure for cold flexibility at extremely low temperatures, and the shrinkage is a measure for the quality and dimensional stability of the molded articles producible by injection molding. The evaluation set forth in the table is made with the objective of providing a high requirement profile of several properties. It can clearly be seen from the table that frequently unilaterally high property values are coupled with other, poor values. The many comparative examples numbered 1–5, 8–10 show clearly that respectively one or several of the desired properties are inadequate to satisfy the requirement profile according to the invention, and that the invention according to Examples 6 and 7 is the sole means for providing a good and very good characteristic in all desired properties.

Examples 1 and 5 demonstrate that binary thermoplastic mixtures of EPDM and polypropylene homopolymer, with too low a content of EPDM, do not exhibit sufficient cold flexibility (Example 1) and, with a higher content of EPDM, show a low dimensional stability under heat (Example 9). It is impossible to optimize the desired properties.

Example 2 shows that, by adding polypropylene copolymers to mixtures according to Example 1, an adverse effect is exerted on the shrinkage of the molded components, i.e. such shrinkage is aggravated, and otherwise there are no improvements in the desired property values, either.

Example 3 demonstrates that binary mixtures of EPDM and propylene-ethylene copolymers are superior to mixtures of Example 1 with polypropylene homopolymers with respect to cold flexibility, but display considerable shrinkage which has an adverse effect on the processability to dimensionally acurate injection-molded components with a complicated configuration.

Example 4 shows, as compared to Example 3, that the addition of very well flowable propylene-ethylene copolymers (MFI 65), though still improving cold flexibility, cannot compensate for the disadvantage of excessive shrinkage.

Example 6 of a molding composition according to the invention shows for the first time a balanced property spectrum with good and very good values regarding mechanical properties, cold flexibility, shrinkage, injection-moldability, and dimensional stability under heat. The same holds true for Example 7 according to the invention.

Examples 8 and 9 show conventional ternary molding compositions on the basis of amorphous or almost amorphous ethylene-propylene polymers, resulting in a property spectrum which considerably deviates from that of the invention, especially as concerns their poor processability in the injection-molding process and their moderate mechanical properties, as clearly evidenced by elongation at yield and tensile strength. The invention is superior to these molding compositions in all respects.

Example 10 shows a ternary molding composition with very low EPDM contents, the mechanical properties and cold flexibility of this composition being likewise clearly inferior to those of the invention.

What is claimed is:

1. Ternary molding composition formed of an admixture of a modified ethylene-propylene copolymer, a propylene polymer and polyethylene, which comprises:

(a) 35–50% by weight of a modified ethylene-propylene copolymer prepared by the polymerization of the ethylene-propylene copolymer proportion onto polyethylene, with an ethylene content of the ethylene-propylene copolymer proportion having at least 65% by weight, a melt index MFI (230/5) of 0.8–2.0 g/10 min, and (b) 30–60% by weight of polypropylene with a melt index MFI (230/5) of 25–65 g/10 min and/or propylene-ethylene copolymer with a melt index MFI (230/5) of 15–50 g/10 min, and (c) 3–30% by weight of polyethylene, wherein the polyethylene block of the modified ethylene-propylene copolymer (a) is attributable to the quantity of polyethylene contained in said composition.

2. A molding composition according to claim 1, wherein the modified ethylene-propylene copolymer contains 5–25% by weight of polyethylene as the polyethylene block, based on 100% by weight of the modified ethylene-propylene copolymer.

3. A molding composition according to claim 1, wherein the polyethylene has a melt index MFI (230/5) of between 15 and 50, preferably between 20 and 40 g/10 min.

4. A molding composition according to claim 1, wherein the composition contains a propylene-ethylene copolymer with a melt index MFI (230/5) of between 20 and 40 g/10 min.

5. A molding composition according to claim 1, wherein the propylene-ethylene copolymer has an ethylene content amounting to not more than 12% by weight.

6. A molding composition according to claim 1, wherein the ethylene-propylene copolymer proportion of the modified ethylene-propylene copolymer comprises an ethylene-propylene bipolymer and/or an ethylene-propylene terpolymer formed of

| | |
|---|---|
| 65–82% | by weight of ethylene |
| 18–35% | by weight of propylene and |
| 0–8% | by weight of a non-conjugated diene tercomponent. |

7. A molding composition according to claim 6, wherein the ethylene-propylene copolymer has an ethylene content of more than 70% by weight.

8. A bumper for automobiles formed by injection molding of the molding composition of claim 1.

* * * * *